No. 729,737. Patented June 2, 1903.

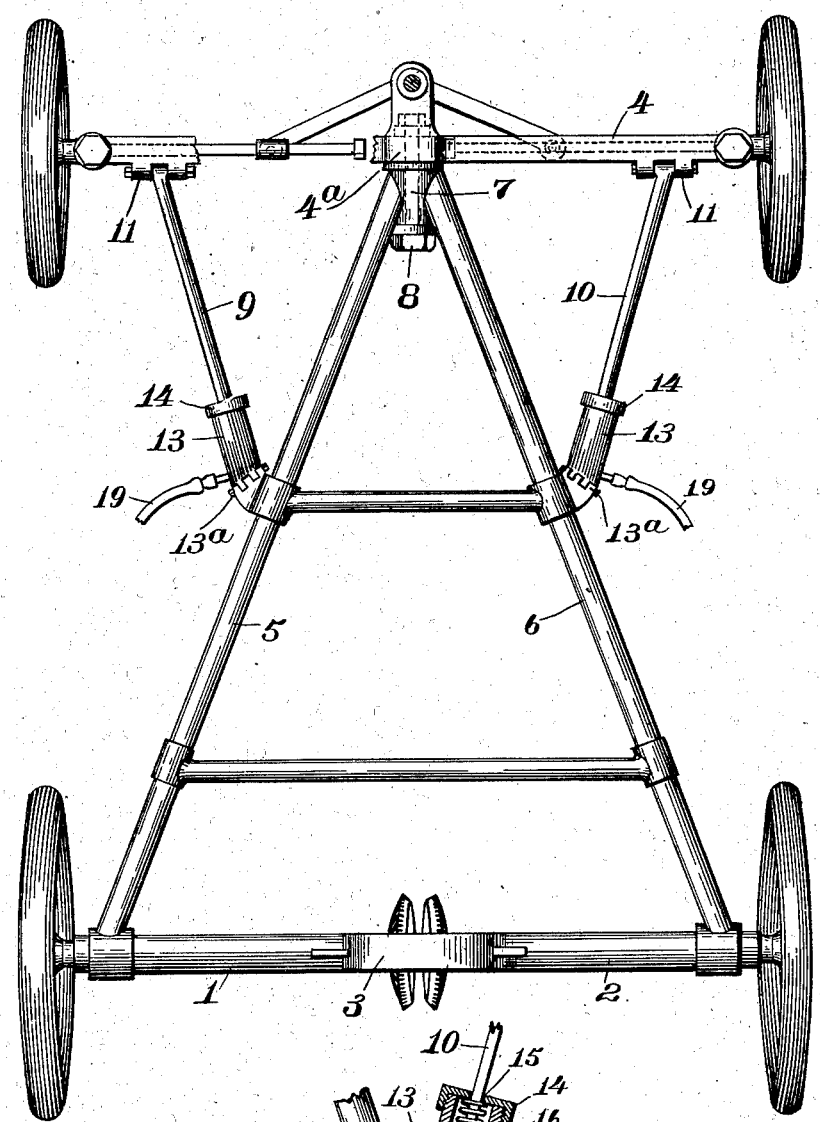

UNITED STATES PATENT OFFICE.

PATRICK J. COLLINS, OF SCRANTON, PENNSYLVANIA, ASSIGNOR OF ONE-HALF TO CHRISTOPHER G. BOLAND, OF SCRANTON, PENNSYLVANIA.

MOTOR-VEHICLE.

SPECIFICATION forming part of Letters Patent No. 729,737, dated June 2, 1903.

Application filed May 20, 1902. Serial No. 108,218. (No model.)

*To all whom it may concern:*

Be it known that I, PATRICK J. COLLINS, a citizen of the United States, residing at Scranton, in the county of Lackawanna and State of Pennsylvania, have invented certain new and useful Improvements in Motor-Vehicles, of which the following is a specification.

This invention comprises improvements in motor-vehicles wherein the forward axle is centrally pivoted to a reach connected with the rear axle, so as to permit relative movement of the axles in vertical planes; and it relates particularly to means for bracing the ends of the forward axle in order to relieve the strain upon the pivotal bolt and to improvements whereby the oscillation of the forward axle serves as a source of power for the operation of air-pumps used for fuel-feeding purposes.

In the accompanying drawings, which illustrate the invention, Figure 1 is a plan view of a vehicle-frame having my improvements thereon; and Fig. 2 is a view showing in section one of the sockets connected to the reach and serving as the cylinder of an air-pump, the piston of which is attached to the brace-rod.

Referring to the drawings, 1 and 2 indicate the two halves of the rear stationary axle, which are connected by a yoke 3 and form a part of the frame. The rear axle is connected with the forward stationary axle 4 by reaches 5 and 6, which are secured at their forward ends to a central hub or bearing 7, said hub being journaled upon a stud or bolt 8, which is secured horizontally in an upward projection 4ª at the center of the fixed axle 4, as shown in Fig. 2. This pivotal connection between the forward axle and the rear axle permits relative movement of the forward and rear wheels in vertical planes.

In order to brace the forward axle for the purpose of preventing strains upon the pivotal bolt 8 when the wheels meet with obstructions, brace-rods 9 and 10 are arranged between the opposite ends of the forward stationary axle and the reaches 5 and 6, respectively, these brace-rods being pivotally connected to the axle and to the reaches. As shown, the brace-rods are connected to the axle by hinge-joints 11, and the rear ends of the rods are, as shown in Fig. 2, provided with piston-heads 12, which fit within sockets or cylinders 13, secured to the reaches 5 and 6. Each socket is connected to the adjacent reach by a hinge-joint 13ª and is provided with a cap 14, threaded onto its outer end and having a slot 15, through which the brace-rod extends. Between the cap and the head 12 upon the rod is arranged a compression-spring 16. A yielding connection is thus provided between the brace-rod and the reach. When an obstruction is met with upon the road which causes either of the forward wheels to rise or fall, it will be apparent that the turning of the axle about the pivotal bolt 8 will increase the distance between the hinges 11 and the bases of the sockets 13. By connecting the brace-rods and the reaches in the manner shown in Fig. 2 the rods are made extensible to accommodate the movement of the forward axle. In passing over smooth roads or streets the vertical movement of the wheels, if any, is so slight that the piston-heads 12 will ordinarily remain about stationary; but when a considerable movement takes place unless some provision is made for the extension of the brace-rods the parts are apt to bind and become strained. By arranging the ends of the rods within sockets and interposing strong compression-springs between the caps and the heads of the rods, as shown in Fig. 2, the rods may turn pivotally and also move outwardly against the action of the springs when the axle 4 turns about the bolt 8. This movement of the axle relatively to the reach-bars, it will be noted, causes both of the brace-bars to draw outwardly against the springs, so that the tension upon each of the rods is substantially the same and the strain upon the pivot-bolt 8 is relieved.

When a steam or other motor using liquid fuel is arranged to drive the vehicle, the longitudinal movements of the brace-rods are availed of to pump air into the fuel tank or reservoir for the purpose of applying pressure to the fuel. The piston-heads 12, as shown in Fig. 2, consist of leather cups so arranged that when the piston is drawn outward in the cylinder the air will pass inward around the piston, and when the piston-head moves inward the air will be compressed and driven through a passage-way 17, past a check-valve 18, into a pipe 19, leading to the fuel-tank. It will thus be seen that in passing over ordinary roads the movement of the brace-rods will furnish a sufficient supply of air for feeding the fuel. At the same time the air within the cylinder will to some extent cushion the backward thrust of the brace-rods. One or both of the sockets or cylinders may be connected to the axle instead of to the reach, the rear ends of the brace-bars in such case being hinged directly to the reach.

Having described my invention, what I claim, and desire to secure by Letters Patent, is—

1. In a motor-vehicle the combination with the rear axle, the reach connected thereto and the forward axle centrally pivoted to the reach, of brace-bars connecting the ends of the forward axle with the reach, each of said bars having a piston-head at one end, pump-cylinders within which said piston-heads are arranged, and valve-controlled passage-ways leading from said cylinders.

2. In a motor-vehicle the combination with the rear axle, the reach connected thereto, and the forward axle centrally pivoted to the reach, of brace-bars connecting the ends of the forward axle with the reach, each of said bars having a piston-head at one end, pump-cylinders within which said piston-heads are arranged, valve-controlled passage-ways leading from said cylinders and springs between said piston-heads and the outer ends of the cylinders.

3. In a motor-vehicle the combination with the rear axle, the reach connected thereto and the forward axle centrally pivoted to the reach, of pump-cylinders secured to the reach, valve-controlled passage-ways leading from said cylinders and brace-rods hinged to the ends of the forward axle and having piston-heads upon their rear ends arranged within the cylinders.

4. In a motor-vehicle the combination with the rear axle, the reach connected thereto and the forward axle centrally pivoted to the reach, of pump-cylinders hinged to the reach, valve-controlled passage-ways leading from said cylinders and brace-rods hinged to the ends of the forward axle and having piston-heads arranged within the cylinders.

In testimony whereof I affix my signature in presence of two witnesses.

PATRICK J. COLLINS.

Witnesses:
 M. F. SANDO,
 GEORGE M. JONES.